Jan. 20, 1931.                M. A. JACKSON                1,789,902
                              POP CORN MACHINE
                            Filed June 19, 1928        3 Sheets-Sheet 1

WITNESS                                          INVENTOR
                                                 M. A. Jackson
                                                 BY
                                                 ATTORNEYS Jan. 20, 1931.  M. A. JACKSON  1,789,902
POP CORN MACHINE
Filed June 19, 1928   3 Sheets-Sheet 2

WITNESS

INVENTOR
M. A. Jackson
BY
ATTORNEYS

Jan. 20, 1931.  M. A. JACKSON  1,789,902
POP CORN MACHINE
Filed June 19, 1928   3 Sheets-Sheet 3
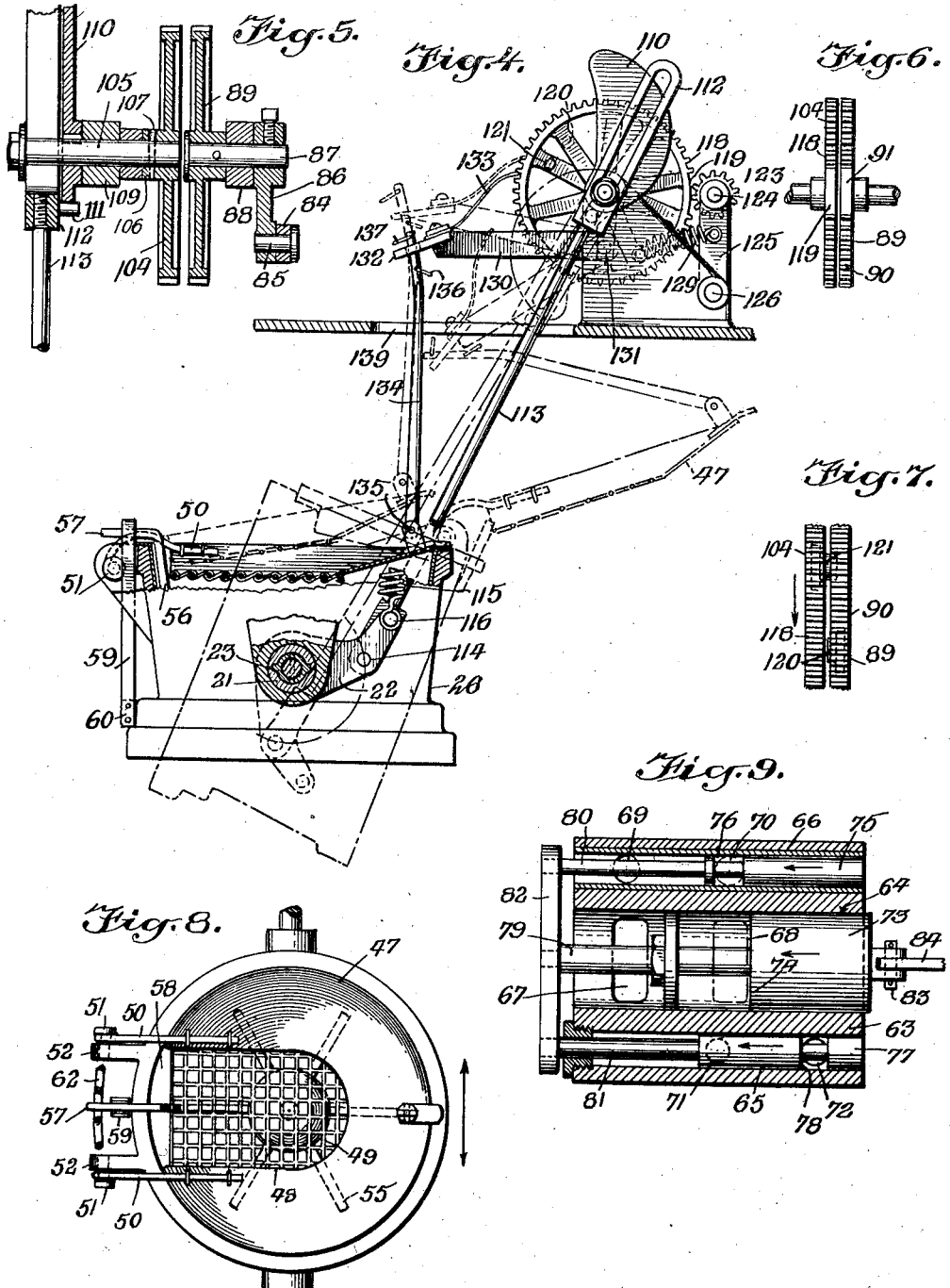
WITNESS
INVENTOR
M. A. Jackson
BY
ATTORNEYS Patented Jan. 20, 1931

1,789,902

UNITED STATES PATENT OFFICE

MASON A. JACKSON, OF NEW YORK, N. Y.

POP-CORN MACHINE

Application filed June 19, 1928. Serial No. 286,606.

This invention relates to machines for popping and seasoning popcorn, and has particular reference to a machine of this character which is completely automatic in its operation so as to require no attention from an operator except to replenish the reservoirs for the popcorn kernels and the seasoning ingredients.

One of the outstanding objects of the present invention is to provide an automatic popcorn popping and seasoning machine in which the operating mechanisms are controlled and rendered active by the increase in the volume of the popped kernels.

The invention further comprehends a machine for popping and seasoning popcorn in which a heated reciprocatory popping vessel automatically receives a predetermined or measured charge of popcorn kernels or seasoning ingredients from a source of supply after the emptied vessel has been returned to its former upright position, the vessel being automatically dumped or emptied and subsequently supplied with the ingredients by virtue of suitable mechanisms which are initially set in motion or rendered active by the lifting of the popping vessel cover due to the increase in the volume of the popped kernels.

Other objects of the invention reside in the simplicity of construction and mode of operation of the machine, the economy with which the same may be produced, installed and operated and the general efficiency and attractiveness of the same as an advertising medium.

With the above recited and other objects in view, reference is had to the following description and accompanying drawings, in which there is exhibited one example or embodiment of the invention, while the claims define the actual scope of the same.

In the drawings:

Figure 4 is a fragmentary vertical longitudinal sectional view illustrating particularly the popping vessel dumping mechanism.

Figure 5 is an enlarged fragmentary transverse sectional view taken approximately on the line 5—5 of Figure 2.

Figure 6 is an edge view of the mutilated gears which control the operation of the dumping mechanism and the seasoning, measuring and discharge valves.

Figure 7 is an enlarged fragmentary edge view of said gears illustrating the means for moving one of the gears by the other.

Figure 8 is a fragmentary plan view of the popping vessel in its former upright position.

Figure 9 is a sectional plan view through the seasoning, measuring and discharging valve mechanism.

Figure 1:
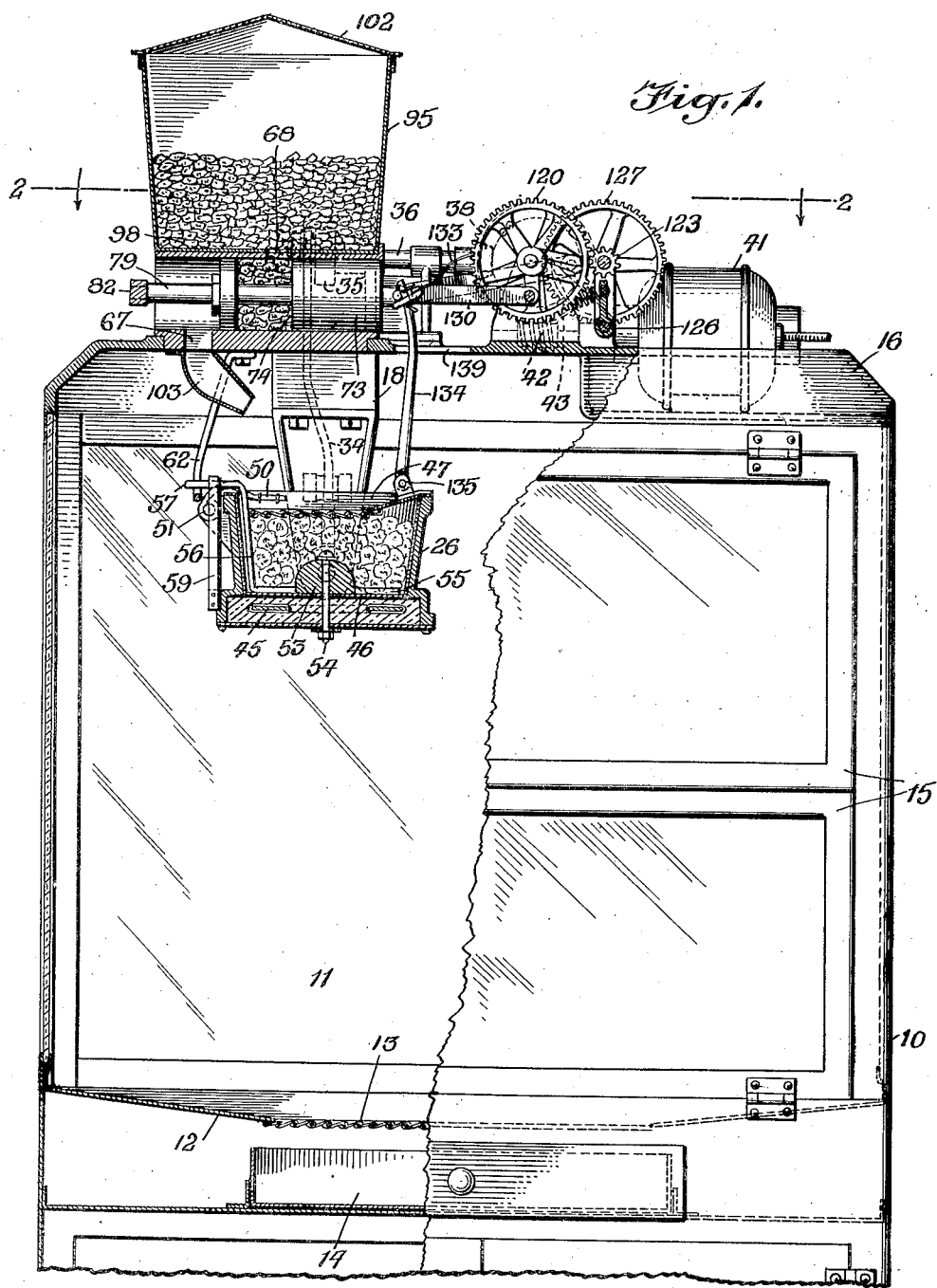
Figure 1 is a fragmentary front elevation of the machine with parts broken away and shown in section to disclose the underlying structure.
Figure 2:
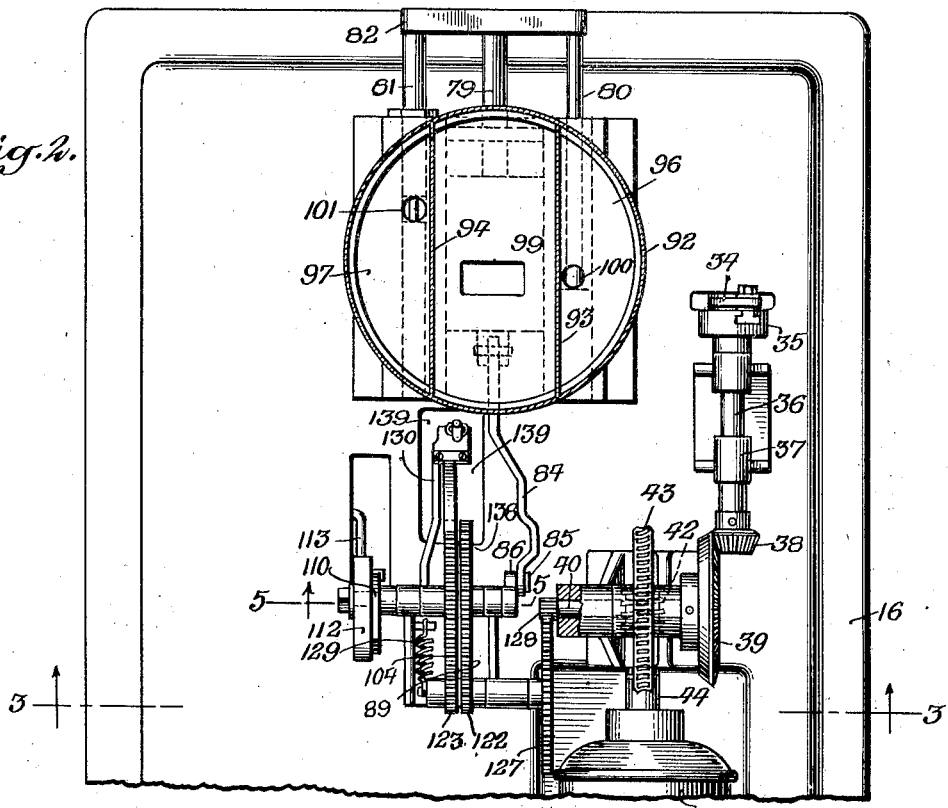
Figure 2 is a fragmentary sectional plan view taken approximately on the line 2—2 of Figure 1.
Figure 3:
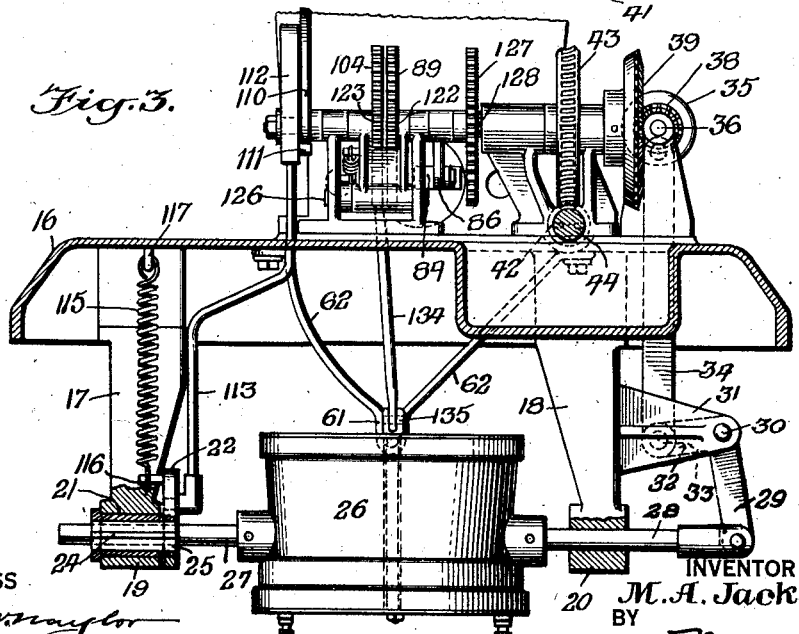
Figure 3 is a transverse vertical sectional view taken approximately on the line 3—3 of Figure 2.

Referring to the drawings by characters of reference, 10 designates a cabinet of any suitable size and configuration to define a compartment 11 for the reception of the popped popcorn. Preferably, the bottom wall 12 of the compartment 11 inclines downwardly and inwardly to a foraminous central portion 13, such as wire mesh, the interstices of which are of a sufficient size to permit of the passage therethrough of unpopped kernels which are adapted to be received in a drawer or receptacle 14 mounted thereunder. The front of the compartment is closed by suitable hinged doors 15, by virtue of which access is gained to the interior of the compartment for removing and dispensing the popped popcorn. The upper end of the compartment is closed by a top wall or crown 16 which serves as a support for the complete popping, seasoning and driving mechanisms. A pair of depending brackets 17 and 18 are provided at their lower ends with bearings 19 and 20 disposed in axial alignment. The bearing 19 has journaled therein for turning movement a sleeve 21, which sleeve has secured thereto a radial arm 22. The sleeve is provided with one or more keyways 23 in its bore or inner periphery to receive the splines or ribs 24 which extend longitudinally of a collar 25, so that the collar is turnable with the sleeve but slidable axially therethrough. The popping vessel 26 is provided with diametrically oppositely projecting trunnions or shaft sections 27 and 28, the former trunnion or shaft section 27 extending through the collar 25 and keyed or otherwise attached thereto for turning and sliding movement therewith. The other trunnion or shaft section 28 is attached to the arm 29 of a bell crank which is fulcrumed at 30 on a projecting portion 31 of the bracket 18. The other arm 32 of the bell crank is pivotally connected at 33 to one extremity of a pitman 34. The pitman 34 is in turn connected at its opposite end with an adjustable eccentric 35 which is attached to a stub shaft 36 mounted in bearings 37 on the upper surface of the top wall or crown 16. The free end of the stub shaft 36 is provided with a beveled pinion 38 which meshes with a bevel gear 39 attached to a transverse shaft 40. The shaft 40 is continuously driven by a motor 41 through the medium of a worm pinion 42 and worm wheel 43, the former being attached to the motor shaft 44 and the latter to the transverse shaft 40. Under this construction and arrangement, it is obvious that while the motor is in operation, the popping vessel 26 is continuously reciprocated transversely to agitate its contents.

The popping vessel is provided with any suitable means for heating the same, which means as illustrated consists of an electric resistance heating element 45 supported directly under the bottom 46 of the vessel. A cover 47 is provided for the upper open end of the popping vessel, and said cover inclines downwardly and inwardly toward the central open or cut-out portion 48 which is closed by a foraminous section 4, such as wire mesh, the interstices of which are of such a size as to allow for the free passage of the unpopped popcorn kernels therethrough while preventing the escape of the popped kernels therefrom. The cover is hingedly attached to the vessel by means of arm 50 which project rearwardly therefrom and are fulcrumed on hinge pins 51 carried by the ears 52 which project outwardly from the rear side of the popping vessel. The combined weight of the cover 47 is such that the pressure exerted by the increase in the volume of the popped kernels supplied thereto is sufficient to lift or raise the cover. Within the bottom of the popping vessel, an agitator is mounted for rotatory movement, said agitator including a hub 53, through which a bolt 54 extends to constitute an axis therefor. The bolt further extends through the bottom of the popping vessel. The hub is provided with radial fingers 55, one of which fingers is formed with an upward extension 56 having a rearwardly and outwardly turned terminal 57 which extends above the upper edge of the vessel and through a space 58 which is defined between the rear edge of the cover and the upper open end of the popping vessel. The terminal 57 is maintained in an approximate central position by a pair of leaf springs 59 which are attached at 60 to the lower portion of the popping vessel and which extend upwardly between the ears 52. The terminal further projects into the restricted lower bight portion 61 of a yoke which depends from the under side of the top wall or crown and which is provided with upwardly and laterally divergent arms 62. It thus follows that when the popping vessel is in its normal upright position that the lateral reciprocatory motion imparted thereto will effect a relative rotatory movement of the agitator with respect to the popping vessel due to the fact that the terminal 57 of one of its fingers is engaged within the restricted bight 61 of the yoke which is stationary.

Mounted within a receiving opening in the top wall or crown 16 is a valve mechanism which includes a casing 63 having an enlarged central cylindrical bore 64 and parallel side cylindrical bores, 65 and 66. The casing is provided with a discharge opening 67 in its under side communicating with the central bore 64 adjacent its rear end and with an intake passage 68 in its upper portion communicating with the central bore 64 and spaced forwardly with respect to the discharge opening 67. The bore 66 is provided with a correspondingly arranged outlet opening 69 and an intake passage 70. The valve casing 63 is provided with an intake passage 71 in its upper portion which communicates with the bore 65 at a point substantially opposite the intake openings 68 and 70, while a discharge opening 72 is provided in the lower portion of the valve casing communicating with the bore 65 at a point spaced forwardly of the intake passage 71. A plunger 73 is mounted for axial movements in the bore 64, and said plunger is formed with an annular cut-out 74 which defines, together with the walls of the bore 64, a measuring port. A valve plunger 75 is mounted for axial movements in the bore 66 and is also provided with a cut-out portion 76 defining, together with the walls of the bore 66, a measuring port. A plunger 77 is mounted for axial movements in the bore 65 and is likewise provided with an annular cut-out portion 78 defining, together with the walls of the bore 65, a measuring port. The plungers 73, 75 and 77 are respectively provided with plunger rods 79, 80 and 81 which are connected to a crosshead 82 disposed exteriorly and rearwardly of the valve casing 63. The intermediate or central plunger 73 is pivotally connected at 83 at its forward end to a connecting rod 84, the opposite end of which connecting rod is journaled at 85 to a crank 86 keyed to a transverse shaft 87 journaled in a bearing 88. The opposite end of the shaft 87 has keyed thereto a mutilated gear 89, the teeth 90 of which are omitted at the point 91. The upper portion or surface of the valve casing 63 has mounted thereon a hopper 92 which is subdivided by partitions 93 and 94 into three compartments, namely, a central large compartment 95 for the reception of popcorn kernels and side compartments 96 and 97 for the reception of grease and salt respectively. The bottom wall 98 of the hopper is provided with openings 99, 100 and 101 which respectively register with the receiving passages 68, 70 and 71 in the upper portion of the valve casing. A removable cover 102 covers the upper open end of the hopper. The discharge openings 67 and 69 are provided with depending angularly disposed chutes 103, the lower outlet ends of which are arranged in vertical alignment with the foraminous section 49 of the popping vessel cover 47 in order to guide the ingredients from the valve mechanism for gravitational discharge into the popping vessel through the foraminous section. The salt discharge opening 72, however, is directly disposed over the cover 47 of the popping vessel, and hence a discharge chute is unnecessary. It is, of course, understood that this arrangement may be altered so that all of the discharge openings may be disposed directly over the upper end of the popping vessel without departing from the scope of the invention.

A mutilated gear 104 is positioned alongside of the mutilated gear 89 on a transverse shaft section 105 which is spaced from but disposed in axial alignment with the transverse shaft section 87. The hub 106 of the gear 104 receives a pin 107 which keys the same to the shaft 105. The shaft 105 is journaled in a bearing 109 on the upper surface of the top wall or crown 16, and said shaft has keyed thereto a cam 110 which engages a cam pin 111 projecting into its path from the slotted guide element 112. The slotted guide element 112 is in turn carried by and secured to a dumping rod 113, the lower end of which is fulcrumed at 114 to the radial arm 22 of the sleeve 21. A spring 115 is attached at 116 to the arm 114, while the opposite end of the spring is anchored at 117 to the underside of the top wall or crown 16. The spring functions to exert a tension on the arm 22 at all times so that the cam pin 111 is forced into contact with the surface of the cam 110. The teeth 118 of the mutilated gear 104 are omitted at the point 119. The mutilated gears 89 and 104 are respectively provided with projecting studs 120 and 121 from their confronting side faces, which studs are so arranged with respect to the untoothed portions 91 and 119 that one of said mutilated gears will be moved by the other at predetermined periods. A pair of driving pinions 122 and 123 are secured to a countershaft 124 for turning movement therewith. The countershaft 124 is journaled in a pivoted bearing 125 which is fulcrumed at 126, and said countershaft has also secured thereto a gear 127 which continuously meshes with a driving pinion 128 on the transverse shaft 40 which is driven by the motor. A spring 129 functions to normally move the bearing 125 in a direction whereby the teeth of the driving pinions 122 and 123 are disposed in a position to mesh with the teeth 90 and 118 of the mutilated gears 89 and 104. An arm 130 is fulcrumed at 131 and is provided at its free end with an apertured ear 132 and with a forwardly projecting dog 133 in the nature of a light leaf spring. An actuating rod 134 is pivoted at 135 to the cover 47 and its upper end extends through the apertured ear 132, stop elements 136 and 137 being provided in the upper terminal of the actuating rod 134 above and below the apertured ear.

In use and operation, the popcorn kernels are supplied to the central compartment 95 of the hopper 92, while grease and salt are respectively supplied to the side compartments 96 and 97. It is, of course, understood that current is supplied to the heating element 45 and to the motor 41 for the purpose of continuously heating the heating element and continuously driving the motor while the machine is in use. The machine when started then requires no further attention except to periodically supply the popcorn kernels, grease and salt to the respective compartments of the hopper. After the initial charge of popcorn kernels has been supplied to the popping vessel 26, together with the seasoning ingredients, the increase in the volume of the popped kernels will raise the cover 47 of the popping vessel. This in turn brings the lower stop element 136 into contact with the apertured ear 132 of the arm 130 and lifts the arm 130 to cause the dog 133 to turn the mutilated gear 104 a sufficient distance to bring the teeth 118 into mesh with the teeth of the driving pinion 123, it being understood that the driving pinion is continuously rotating in a counter clockwise direction, as viewed in Figure 4. The mutilated gear 104 then turns in a clockwise direction, as viewed in Figure 4, thereby turning the cam 110 therewith and causing said cam to exert a thrust on the cam pin 111 effecting a downward thrust on the dumping rod 113 which in turn, due to its connection at 114 with the arm 22, turns the sleeve 21 in a clockwise direction against the action of the spring 115. Due to the splined connection between the sleeve and collar 25 which is keyed to the trunnion or shaft section 27, the popping vessel 26 is rocked to the dumping position illustrated in broken lines in Figure 4. During this operation, it is obvious that the cover 47 is held upwardly by the actuating rod 134 for the reason that the upper stop element 137 engages with the apertured ear 132 while the arm 130 comes to rest by engagement with the edge 138 of the slot 139. After the high point of the cam 110 passes the cam pin 111, the spring 115 functions to raise and return the arm 22 to its normal position, thereby rocking the popping vessel 26 back to its normal upright position. During this operation, the mutilated portion 91 of the gear 89 is disposed in registry with the driving pinion 122 so that the valve mechanism is at rest. When the popping vessel has been returned approximately to its normal upright position and just prior to the time when mutilated portion 119 of the gear 104 reaches its driving pinion 123, the stud 121 of the pinion 104 contacts with the stud 120 of the pinion 89 so that the pinion 104 still being driven by its drive pinion 123 turns the mutilated gear 89 beyond the mutilated portion 91 to dispose its teeth 90 in contact with its driving pinion 122. This, obviously, turns the shaft 87 and the crank 86 to effect reciprocation of the plungers 73, 75 and 77 through the medium of the connecting rod 84. The measuring ports, 74, 76 and 78 of the plungers which are now in registry with the inlet passages 68, 70 and 71 move rearwardly with their charges of kernels, grease and salt. At the rearmost stroke of the movement of the plungers, the measuring ports 76 and 74 register with the outlet openings 67 and 69 to discharge the kernels and the grease simultaneously through the chute 103 into the popping vessel through the forminated portion 49 thereof. On the forward or return stroke of the plungers, the measuring ports 74 and 76 are again brought into registry with the receiving passages 68 and 70, while the salt which has been received during the rearward stroke into the measuring port 78 of the plunger 77 through the charging passage 71 is now registered with the discharge opening 72 and permitted to gravitate into the popping vessel. During this operation of the valve mechanism, the mutilated portion 119 of the gear 104 is in registry with its driving pinion 123 so that the dumping mechanism is at rest. When the return stroke of the plungers has been completed, the mutilated portion 91 of the gear 89 is disposed in registry with its driving pinion 122 so that the valve mechanism is now at rest and only the reciprocatory action of the popping vessel is in progress. The dumping mechanism remains inactive until such time as the charge of popcorn kernels has been popped to such an extent as to increase the volume contained in the popping vessel for again elevating the cover 47, when the cycle of operations is again started.

Due to the disposition of the corn, grease and salt reservoirs over the heated popping vessel, the heat therefrom will maintain the grease in a melted condition, while the salt will be kept dry and free from lumps.

It is, therefore, evident from the foregoing that an absolutely automatic corn popping machine has been devised which is comparatively simple and inexpensive and which is highly efficient for the purpose for which it is intended.

What is claimed is:

1. An automatic popcorn machine including a popping vessel, means for dumping and returning said vessel to a normal position, means for supplying the same with popcorn kernels and seasoning ingredients and means operable by the increase in the volume of the popped corn for setting into motion said vessel dumping and returning means and for rendering active the means for supplying the vessel with its contents.

2. An automatic popcorn machine including a popping vessel, mechanism for dumping and returning the popping vessel to a normal upright position, means for recharging the vessel with ingredients, and means operable by the increase in the volume of the popped kernels for rendering active the vessel dumping and returning means and the recharging means.

3. A popcorn machine including mechanism for dumping a popping vessel and returning the same to a normal position and for charging the same with a quantity of popcorn kernels and seasoning ingredients and means operable by the increase in the volume of the popped corn for setting into motion said mechanism.

4. A popcorn machine including a heated popping vessel, separate reservoirs for the popcorn kernels and the seasoning ingredients, mechanism for dumping and returning the vessel to the normal position, mechanism for supplying a predetermined quantity of the ingredients to the popping vessel and means operable by the increase in the volume of the popped kernels for rendering said mechanism active.

5. A popcorn machine including a heated popping vessel, separate reservoirs for the popcorn kernels and the seasoning ingredients, mechanism for dumping and returning the vessel to the normal position, means for supplying a predetermined quantity of the ingredients to the popping vessel, continuously operating driving means for said mechanisms and means operable by the increase in the volume of the popped kernels for coupling the mechanism successively with said driving means.

6. A popcorn machine including a heated popping vessel, separate reservoirs for the popcorn kernels and the seasoning ingredients, mechanism for dumping and returning the vessel to the normal position, mechanism for supplying a predetermined quantity of the ingredients to the popping vessel, means operable by the increase in the volume of the popped kernels for rendering said mechanisms active and a connection between said driving means and said vessel for reciprocating the same to keep the ingredients in motion.

7. In a popcorn machine, a heated popping vessel having a foraminous cover through which unpopped kernels are fed to the vessel, mechanism for dumping and returning the vessel to the normal position, continuously operating driving means for said mechanism and means operable by lifting of the cover by the increase in volume of the popped kernels for coupling said mechanism with the driving means.

8. In a popcorn machine, a heated popping vessel having a foraminous cover through which unpopped kernels are fed to the vessel, mechanism for dumping and returning the vessel to the normal position, continuously operating driving means for said mechanism, means operable by lifting of the cover by the increase in volume of the popped kernels for coupling said mechanism with the driving means and sifter means underlying the dumping portion of the popping vessel for separating and conveying off the unpopped kernels and other foreign matter from the popped kernels.

9. In a popcorn machine, a heated popping vessel having a foraminous cover through which unpopped kernels are fed to the vessel, mechanism for dumping and returning the vessel to the normal position, continuously operating driving means for said mechanism, means operable by lifting of the cover by the increase in volume of the popped kernels for coupling said mechanism with the driving means and a connection between the continuously operating driving means and the popping vessel for reciprocating the same.

10. A popcorn machine comprising a heated popping vessel, separate reservoirs for the popcorn kernels and seasoning ingredients, mechanism for dumping and returning the vessel to the normal position, valve means operable to supply a predetermined quantity of the ingredients from the reservoirs to the popping vessel, and means operable by the increase in the volume of the popped kernels for rendering said mechanism active to dump and return the vessel and to subsequently actuate the valve means to charge the vessel with the ingredients.

11. A popcorn machine comprising a heated popping vessel, separate reservoirs for the popcorn kernels and seasoning ingredients, mechanism for dumping and returning the vessel to the normal position, valve means operable to supply a predetermined quantity of the ingredients from the reservoirs to the popping vessel, and means operable by the increase in the volume of the popped kernels for rendering said mechanism active to dump and return the vessel and to subsequently actuate the valve means to charge the vessel with the ingredients, said latter means comprising a foraminous cover for the popping vessel liftable by increase in the volume of the popped kernels and having a connection with the mechanism for dumping and returning the vessel, and with the valve actuated means.

12. In a popcorn machine, a heated popping vessel, separate reservoirs for popcorn kernels and seasoning ingredients, mechanism for dumping and returning the vessel to a normal upright position, a valve mechanism operable to measure and supply a predetermined quantity of popcorn kernels and seasoning ingredients to the popping vessel when said vessel is in its upright normal position, continuously operating driving means for said mechanisms and means operable by the increase in the volume of the popped kernels in the popping vessel for successively coupling the vessel dumping and returning mechanism and the valve mechanism with the driving means.

13. In a popcorn machine, a heated popping vessel, separate reservoirs for popcorn kernels and seasoning ingredients, mechanism for dumping and returning the vessel to a normal upright position, a valve mechanism operable to measure and supply a predetermined quantity of popcorn kernels and seasoning ingredients to the popping vessel when said vessel is in its upright normal position, continuously operating driving means for said mechanism, means operable by the increase in the volume of the popped kernels in the popping vessel for successively coupling the vessel dumping and returning mechanism and the valve mechanism with the driving means and a connection between the driving means and the popping vessel for continuously reciprocating the same laterally to maintain the contents in motion.

14. In a popcorn machine, a heated popping vessel, separate reservoirs for popcorn kernels and seasoning ingredients, mechanism for dumping and returning the vessel to a normal upright position, a valve mechanism operable to measure and supply a predetermined quantity of popcorn kernels and seasoning ingredients to the popping vessel when said vessel is in its normal upright position, continuously operating driving means for said mechanism, means operable by the increase in the volume of the popped kernels in the popping vessel for successively coupling the vessel dumping and returning mechanism and the valve mechanism with the driving means, a connection between the driving means and the popping vessel for continuously reciprocating the same laterally to maintain the contents in motion and a rotatory agitator within the popping vessel operable when the vessel is in its upright position to agitate the contents.

15. In a popcorn machine, a heated popping vessel, a hinged cover therefor having a foraminous portion adapted to receive therethrough unpopped popcorn kernels while preventing the passage therethrough of popped popcorn kernels, separate reservoirs for the popcorn kernels and seasoning ingredients, mechanism for dumping and returning the vessel to a normal upright position and for causing the cover to be opened when in the dumping position, a valve mechanism operable to measure and supply a predetermined quantity of the popcorn kernels and seasoning ingredients to the popping vessel when in its normal upright position, continuously operating driving means for said mechanisms and means operable by the increase in the volume of the popped kernels in the popping vessel for elevating the cover whereby to successively effect the coupling of the vessel dumping and returning mechanism and the valve mechanism with the driving means.

16. A popcorn machine including a popping vessel, a relatively movable cover therefor, mechanism for dumping and returning the vessel to a normal position and an operative connection between the cover and said mechanism for rendering said mechanism active by relative movement of the cover with respect to the vessel due to the increase in the volume of the popped corn.

17. An automatic popcorn machine including a popping vessel having a cover movable by the increase in the volume of the popped kernels, a mechanism for dumping the vessel and a connection between said mechanism and the cover adapted to be rendered active by relative movement of the cover with respect to the vessel.

18. An automatic popcorn machine including a popping vessel, means for dumping the same, means for supplying the same with popcorn kernels and seasoning ingredients and means operable by the increase in the volume of the popped corn for setting into motion said dumping means and for rendering the vessel supplying means active to charge the same with its contents.

19. A popcorn machine including a popping vessel, means for dumping the same and means operable by the increase in the volume of the popped corn in the vessel for setting into motion said dumping means.

Signed at New York city, in the county of New York and State of New York, this 7th day of June, 1928.

MASON A. JACKSON.